(12) United States Patent
Yu et al.

(10) Patent No.: US 11,052,749 B2
(45) Date of Patent: Jul. 6, 2021

(54) LONGITUDINALLY MOUNTED DUAL-POWER SOURCE AUTOMOBILE DRIVE ASSEMBLY

(71) Applicant: JING-JIN ELECTRIC TECHNOLOGIES CO., LTD., Beijing (CN)

(72) Inventors: Ping Yu, Beijing (CN); Ting Wang, Beijing (CN); Jianwen Li, Beijing (CN)

(73) Assignee: JING-JIN ELECTRIC TECHNOLOGIES CO., LTD., Beijing (CN)

( * ) Notice: Subject to any disclaimer, the term of this patent is extended or adjusted under 35 U.S.C. 154(b) by 0 days.

(21) Appl. No.: 16/490,875

(22) PCT Filed: Apr. 1, 2017

(86) PCT No.: PCT/CN2017/079359
§ 371 (c)(1),
(2) Date: Sep. 3, 2019

(87) PCT Pub. No.: WO2018/161389
PCT Pub. Date: Sep. 13, 2018

(65) Prior Publication Data
US 2020/0122564 A1    Apr. 23, 2020

(30) Foreign Application Priority Data

Mar. 6, 2017    (CN) .......................... 201720212406.5

(51) Int. Cl.
*B60K 6/547* (2007.10)
*B60K 6/48* (2007.10)
(Continued)

(52) U.S. Cl.
CPC ................ *B60K 6/547* (2013.01); *B60K 6/48* (2013.01); *B60W 10/08* (2013.01); *B60W 10/11* (2013.01);
(Continued)

(58) Field of Classification Search
CPC ....... B60W 10/08; B60W 10/11; B60K 6/547; B60K 6/48; B60K 6/36; B60K 2006/4825; F16H 3/0915; F16H 3/091; Y02T 10/6221
(Continued)

(56) References Cited

U.S. PATENT DOCUMENTS

| 6,427,549 B1 * | 8/2002 | Bowen | .................... F16H 3/006 |
| | | | 74/331 |
| 2002/0033059 A1 * | 3/2002 | Pels | ........................ F16H 63/22 |
| | | | 74/329 |

(Continued)

FOREIGN PATENT DOCUMENTS

| CN | 201753013 U | 3/2011 |
| CN | 103863086 A | 6/2014 |

(Continued)

OTHER PUBLICATIONS

English translation of DE10203514A1; http://translationportal.epo.org; Oct. 7, 2020 (Year: 2020).*

*Primary Examiner* — Roger L Pang
(74) *Attorney, Agent, or Firm* — LKGlobal | Lorenz & Kopf, LLP (57) ABSTRACT

A drive assembly is provided with an automatic transmission, comprising a first input shaft, a first power source is connected to the first input shaft, an output shaft, and an intermediate shaft; a first stage of deceleration gear train is mounted through the first input shaft and the intermediate shaft, an Nth stage of deceleration gear train is mounted
(Continued)

through the intermediate shaft and the output shaft, and N≥2; and a second input shaft is provided parallel to the intermediate shaft or the output shaft, a second power source is connected to the second input shaft, a driving gear on the second input shaft is engaged with any the second stage to the Nth stage, and the power of the second power source is transmitted to the output shaft via the one stage of deceleration gear train.

9 Claims, 6 Drawing Sheets

(51) Int. Cl.
*B60W 10/08* (2006.01)
*B60W 10/11* (2012.01)
B60K 6/36 (2007.10)
F16H 3/091 (2006.01)

(52) U.S. Cl.
CPC ........ *B60K 6/36* (2013.01); *B60K 2006/4825* (2013.01); *B60Y 2400/428* (2013.01); *F16H 3/0915* (2013.01)

(58) Field of Classification Search
USPC .......................................................... 74/329
See application file for complete search history.

(56) References Cited

U.S. PATENT DOCUMENTS

| | | | | |
|---|---|---|---|---|
| 2002/0053475 | A1* | 5/2002 | Bitsche | B60K 6/547 180/65.1 |
| 2003/0104901 | A1* | 6/2003 | Fukushima | B60K 6/547 477/3 |
| 2012/0006153 | A1 | 1/2012 | Imamura et al. | |
| 2014/0157924 | A1* | 6/2014 | Wechs | F16H 3/006 74/330 |
| 2016/0325614 | A1 | 11/2016 | Lian et al. | |
| 2019/0359045 | A1* | 11/2019 | Yu | B60K 6/387 |
| 2020/0240493 | A1* | 7/2020 | Yu | B60K 17/22 |

FOREIGN PATENT DOCUMENTS

| | | | | |
|---|---|---|---|---|
| CN | 104696449 A | 6/2015 | | |
| CN | 104930137 A | 9/2015 | | |
| CN | 105459793 A | 4/2016 | | |
| CN | 106337905 A | 1/2017 | | |
| CN | 106369110 A | 2/2017 | | |
| CN | 106458007 A | 2/2017 | | |
| DE | 10136725 A1 | 2/2002 | | |
| DE | 10133695 A1 | 3/2002 | | |
| DE | 10143289 A1 | 3/2003 | | |
| DE | 10203514 A1 * | 8/2003 | ............ B60W 10/08 | |
| DE | 102012222681 A1 | 6/2014 | | |
| EP | 0492152 A1 | 7/1992 | | |
| JP | H11201243 A | 7/1999 | | |
| JP | 2003232412 A | 8/2003 | | |
| JP | 2004306827 A | 11/2004 | | |
| JP | 2005240580 A | 9/2005 | | |
| JP | 2005351381 A | 12/2005 | | |
| JP | 2008062678 A | 3/2008 | | |
| WO | 2001003962 A1 | 1/2001 | | |

* cited by examiner

LONGITUDINALLY MOUNTED DUAL-POWER SOURCE AUTOMOBILE DRIVE ASSEMBLY

CROSS-REFERENCE TO RELATED APPLICATION

This application is a U.S. National-Stage entry under 35 U.S.C. § 371 based on International Application No. PCT/CN2017/079359, filed Apr. 1, 2017 which was published under PCT Article 21(2) and which claims priority to Chinese Application No. 201720212406.5, filed Mar. 6, 2017. These priority applications are hereby incorporated herein in their entirety by reference.

TECHNICAL FIELD

This Application pertains to a longitudinal dual-power-source vehicle drive assembly, connected to a front axle or rear axle of a vehicle, for driving the vehicle.

BACKGROUND

Current automobiles are usually provided with a single power source, and a transmission is connected to the single power source. The employed transmission is a two-speed, three-speed or four-speed transmission, and the power will be interrupted during gear shifting, which affects the travelling state of the vehicle. For example, in the structure disclosed by the Chinese utility model patent "Automatic Transmission" (CN104930137A), during gear shifting the electromagnetic clutch is required to be disengaged, and at this point the power connection between the input shaft and the output shaft is broken.

Because a single power source is employed, in the work condition of starting or the work condition of requiring to increase the torque, the current vehicles commonly have the defect of shortage of power. In addition, other objects, desirable features and characteristics will become apparent from the subsequent summary and detailed description, and the appended claims, taken in conjunction with the accompanying drawings and this background.

SUMMARY

Aiming at the above problems of the prior art, the present disclosure provides a longitudinal dual-power-source vehicle drive assembly, provided with dual power sources, wherein the first power source is a primary power source, and the second power source is an auxiliary power source. It can solve the problem that single-power-source vehicles are underpowered in such work conditions as starting and requiring to increase the torque, and also selectively solves the problem of power interruption of the transmission during gear shifting.

To achieve the above objects, the technical solutions of the present disclosure are realized as follows:

The present disclosure provides a longitudinal dual-power-source vehicle drive assembly, connected to a vehicle axle half shaft, wherein the longitudinal dual-power-source vehicle drive assembly is provided with an automatic transmission, the automatic transmission comprises a first input shaft, a first power source is connected to the first input shaft, an output shaft is provided coaxial with the first input shaft, and an intermediate shaft is provided parallel to the first input shaft; and a first stage of deceleration gear train is mounted through the first input shaft and the intermediate shaft, an Nth stage of deceleration gear train is mounted through the intermediate shaft and the output shaft, N≥2, and each of the stages of deceleration gear train comprises a pair of gears with unequal transmission ratios; wherein a second input shaft is provided parallel to the intermediate shaft or the output shaft, a second power source is connected to the second input shaft, the second input shaft is provided with a driving gear, the driving gear is engaged with any one of stages from a second stage to the Nth stage of deceleration gear train, and power of the second power source is transmitted to the output shaft via the one stage of deceleration gear train.

Optionally, in the Nth stage of deceleration gear train, one upper gear is fixedly connected to the output shaft by a key, one lower gear is loosely nested on the intermediate shaft, the driving gear of the second power source is engaged with the upper gear or the lower gear, and power of the second power source is able to be uninterruptedly transmitted to the output shaft via the one stage of deceleration gear train.

Optionally, in the Nth stage of deceleration gear train, one upper gear is loosely nested on the output shaft, one lower gear is fixedly connected to the intermediate shaft by a key, the driving gear of the second power source is engaged with the upper gear or the lower gear, and only when the one stage of deceleration gear train is serving to decelerate, power of the second power source is transmitted to the output shaft via the one stage of deceleration gear train.

Optionally, the second power source is an electric motor, and the first power source is an engine, or is a combination of an engine and an ISG motor, or is an electric motor.

Optionally, the first input shaft and a driving shaft of the first power source are integrally manufactured, and the second input shaft and a driving shaft of the second power source are integrally manufactured.

Optionally, a torsion damper is provided between the engine and the ISG motor.

Optionally, a cut-off clutch or synchronizer is provided at the first input shaft and/or the second input shaft.

Optionally, in the first stage to Nth stage of deceleration gear train, each of the stages of deceleration gear train is provided with a shifting clutch or synchronizer cooperating therewith.

Optionally, the cut-off clutch, the shifting clutch or the synchronizer is electromagnetically driven, or hydraulically driven, or pneumatically driven, or electrically driven.

Optionally, the vehicle axle half shaft is a front axle half shaft or a rear axle half shaft.

The drive assembly, by employing the above structure configurations, has the following advantages:

The vehicle power assembly of the present disclosure is connected to the rear axle half shaft or the front axle half shaft of the vehicle. The vehicle power assembly can realize dual power source input and transmission of multiple speed ratios, and the transmission modes and the power input modes are flexible, which satisfies the demands of the entire vehicle on travelling on different road conditions. When the vehicle is climbing a slope with a weight burden, it can select the dual power input and the larger speed ratio transmission, to increase the driving force of the entire vehicle and overcome the defect of the deficient driving force of the entire vehicle. When the entire vehicle is in the cruising condition, it can select the single power input and the smaller speed ratio transmission, to satisfy the requirement by the entire vehicle on high-speed travelling, save energy, and increase the endurance mileage of the vehicle.

When the vehicle is starting, the first power source and the second power source can be simultaneously started up, to increase the total driving force of the drive assembly, to shorten the acceleration process of the vehicle, to more quickly reach high-speed travelling.

When the vehicle is shifting gear, the first power source and the second power source can be simultaneously started up, to ensure that the power of the vehicle is not interrupted.

The design mode of the torsion damper in combination with the contrate tooth clutches can minimize the kinetic energy loss, which overcomes the defect of traditional friction clutches that have too short service lives because they cannot withstand the dynamic shock of the electric motor.

BRIEF DESCRIPTION OF DRAWINGS

The present invention will hereinafter be described in conjunction with the following drawing figures, wherein like numerals denote like elements, and.

In the drawings: 11. first gear; 12. second gear; 13. third gear; 14. fourth gear; 15. fifth gear; 16. sixth gear; 17. seventh gear; 18. eighth gear; 19. driving gear;

21. first input shaft; 22. intermediate shaft; 23. output shaft; 24. second input shaft;

30. shifting clutch; 31. first shifting clutch; 32. second shifting clutch; 33. third shifting clutch; 34. fourth shifting clutch;

41. first power source; 42. second power source;

50. automatic transmission;

51. first cut-off clutch; 52. second cut-off clutch;

61. torsion damper; 62. ISG motor.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

In order to make the objects, the technical solutions and the advantages of the present disclosure clearer, the embodiments of the present disclosure will be described below in further detail in conjunction with the drawings.

The First Embodiment

Figure 1:
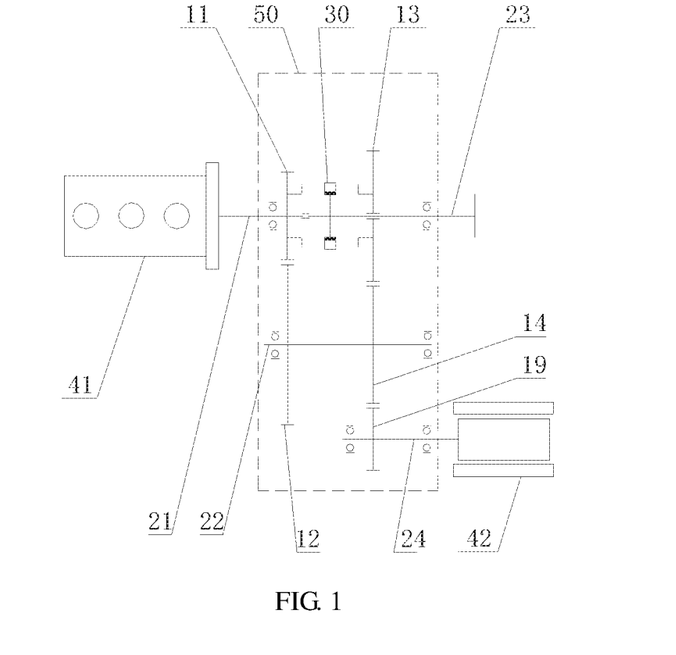
FIG. 1 is a schematic structural diagram of the first embodiment of the present disclosure.

FIG. 1 shows the first embodiment of the present disclosure. In this embodiment, a longitudinal dual-power-source vehicle drive assembly, connected to a vehicle axle half shaft, wherein the longitudinal dual-power-source vehicle drive assembly is provided with an automatic transmission 50, the automatic transmission 50 comprises a first input shaft 21, a first power source 41 is connected to the first input shaft 21, an output shaft 23 is provided coaxial with the first input shaft 21, and an intermediate shaft 22 is provided parallel to the first input shaft 21; and a first stage of deceleration gear train is mounted through the first input shaft 21 and the intermediate shaft 22, a second stage of deceleration gear train is mounted through the intermediate shaft 22 and the output shaft 23, and each of the stages of deceleration gear train comprises a pair of gears with unequal transmission ratios.

As shown in FIG. 1, the first stage of deceleration gear train comprises a first gear 11 and a second gear 12, and the second stage of deceleration gear train comprises a third gear 13 and a fourth gear 14.

A second input shaft 24 is provided parallel to the intermediate shaft 22 or the output shaft 23, a second power source 42 is connected to the second input shaft 24, the second input shaft 24 is provided with a driving gear 19, the driving gear 19 is engaged with the second stage of deceleration gear train, and the power of the second power source 42 is transmitted to the output shaft 23 via the one stage of deceleration gear train.

The second power source 42 may be started up or shut down. When the second power source 42 is started up, the total driving force of the drive assembly can be increased, and when the vehicle is starting, the acceleration process of the vehicle can be shortened, to more quickly reach high-speed travelling.

In the second stage of deceleration gear train, the third gear 13 is loosely nested on the output shaft 23, the fourth gear 14 is fixedly connected to the intermediate shaft 22 by a key, and the driving gear 19 of the second power source 42 is engaged with the fourth gear 14. Only when the one stage of deceleration gear train is serving to decelerate, the power of the second power source 42 is transmitted to the output shaft 23 via the one stage of deceleration gear train, and at this point the second power source 42 serves to provide an auxiliary power.

In this embodiment, the second power source 42 is an electric motor, and the first power source 41 is an engine.

The first input shaft 21 and the driving shaft of the first power source 41 are integrally manufactured, and the second input shaft 24 and the driving shaft of the second power source 42 are integrally manufactured.

In the first stage of deceleration gear train and the second stage of deceleration gear train, each of the stages of deceleration gear train is provided with a shifting clutch cooperating therewith. As shown in FIG. 1, a shifting clutch 30 comprises a dual-contrate-tooth combined fluted disc, the dual-contrate-tooth combined fluted disc can slide on the output shaft 23, and can cooperate via a spline, the first gear 11 is provided with a right contrate tooth, and the second gear 12 is provided with a left contrate tooth.

The dual-contrate-tooth combined fluted disc slides leftwardly to be engaged with the right contrate tooth of the first gear 11, and the power of the first power source 41 is transmitted to the output shaft 23 via the first input shaft 21, the first gear 11 and the shifting clutch 30.

The dual-contrate-tooth combined fluted disc slides rightwardly to be engaged with the left contrate tooth of the third gear 13, and the power of the first power source 41 is transmitted to the output shaft 23 via the first input shaft 21, the first gear 11, the second gear 12, the intermediate shaft 22, the fourth gear 14, the third gear 13 and the shifting clutch 30.

The shifting clutch 30 is of an electromagnetically driven type, or a hydraulically driven type, or a pneumatically driven type, or an electrically driven type.

When the shifting clutch 30 is of an electromagnetically driven type, an electromagnetic jaw clutch may be employed. When the vehicle drive assembly is performing power input, the electromagnetic jaw clutch can enable the power and the entire vehicle to be disengaged and engaged instantly at any moment, which realizes the smooth switch of the power and increases the travelling stability of the vehicle.

A synchronizer may be employed to replace the shifting clutch, to control the engagement and disengagement of the power. The synchronizer may be of an electromagnetically driven type, or a hydraulically driven type, or a pneumatically driven type, or an electrically driven type. The vehicle axle half shaft is a front axle half shaft or a rear axle half shaft. The output shaft 23 in the drive assembly is connected to the front axle half shaft or the rear axle half shaft, and usually a transmission shaft is provided between the output shaft 23 and the vehicle axle half shaft. When the vehicle drive assembly is connected to the front axle half shaft, the vehicle is in a front driving mode, and when the vehicle drive assembly is connected to the rear axle half shaft, the vehicle is in a rear driving mode.

It can be known from the above contents that, the vehicle drive assembly can realize dual power source input and transmission of two speed ratios, and the transmission modes are flexible, which satisfies the demands of the entire vehicle on travelling on different road conditions. When the vehicle is climbing a slope with a weight burden, it can select the dual power input and the larger speed ratio transmission, to increase the driving force of the entire vehicle and overcome the defect of the deficient driving force of the entire vehicle. When the entire vehicle is in the cruising condition, it can select the single power input and the smaller speed ratio transmission, to satisfy the requirement by the entire vehicle on high-speed travelling, save energy, and increase the endurance mileage of the vehicle. Furthermore, when the vehicle is starting, the first power source 41 and the second power source 42 are simultaneously started up, and the total driving force of the drive assembly can be increased, to shorten the acceleration process of the vehicle, to more quickly reach high-speed travelling.

The Second Embodiment

Figure 2:
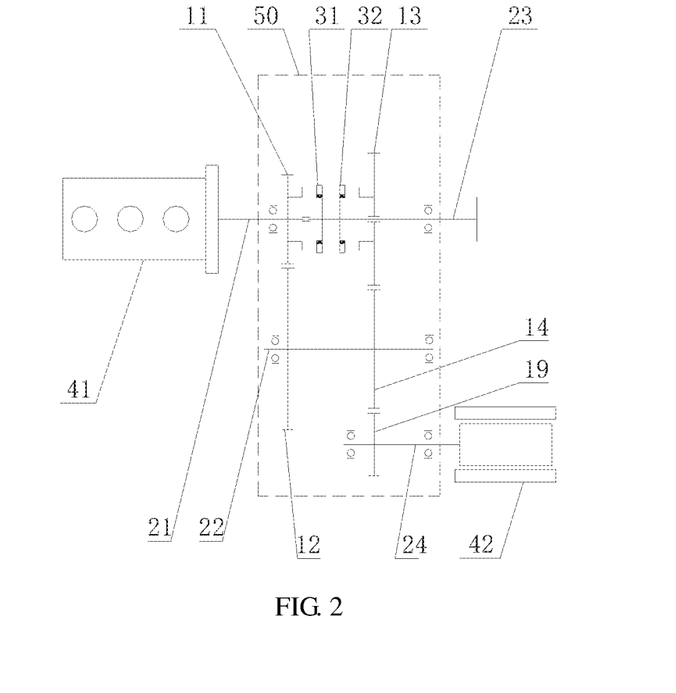
FIG. 2 is a schematic structural diagram of the second embodiment of the present disclosure.

FIG. 2 shows the second embodiment of the present disclosure. This embodiment is an improvement made on the basis of the first embodiment, and is different from the first embodiment in the structure of the shifting clutch, wherein a first shifting clutch 31 is provided cooperating with the first gear 11, and a second shifting clutch 32 is provided cooperating with the third gear 13.

As shown in FIG. 2, the first shifting clutch 31 comprises a left-contrate-tooth fluted disc, the second shifting clutch 32 comprises a right-contrate-tooth fluted disc, the left-contrate-tooth fluted disc and the right-contrate-tooth fluted disc can slide on the output shaft 23 individually, and can cooperate via a spline, the first gear 11 is provided with a right contrate tooth, and the second gear 12 is provided with a left contrate tooth.

The left-contrate-tooth fluted disc slides leftwardly to be engaged with the right contrate tooth of the first gear 11, and the power of the first power source 41 is transmitted to the output shaft 23 via the first input shaft 21, the first gear 11 and the first shifting clutch 31.

The right-contrate-tooth fluted disc slides rightwardly to be engaged with the left contrate tooth of the third gear 13, and the power of the first power source 41 is transmitted to the output shaft 23 via the first input shaft 21, the first gear 11, the second gear 12, the intermediate shaft 22, the fourth gear 14, the third gear 13 and the second shifting clutch 32.

The other structures of this embodiment are the same as those of the first embodiment, and are not described repeatedly here.

The Third Embodiment

Figure 3:
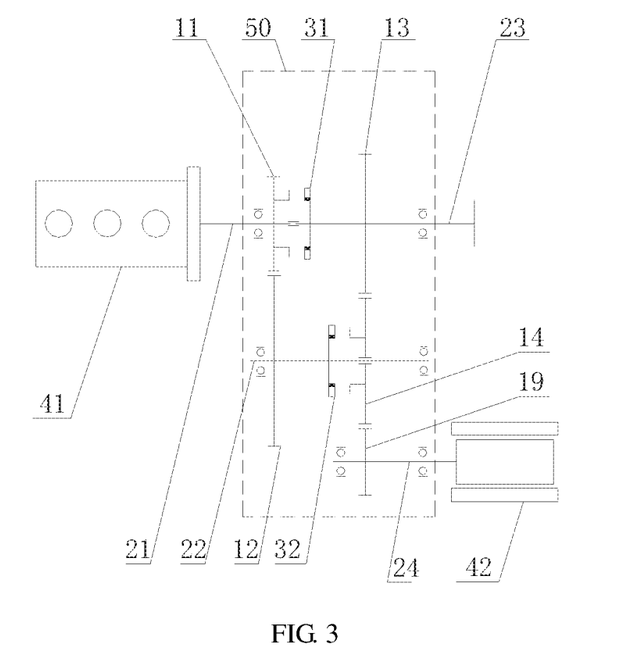
FIG. 3 is a schematic structural diagram of the third embodiment of the present disclosure.

FIG. 3 shows the third embodiment of the present disclosure. This embodiment is an improvement made on the basis of the second embodiment, and is different from the second embodiment in the structure of the second stage of deceleration gear train, wherein the third gear 13 is fixedly connected to the output shaft 23 by a key, the fourth gear 14 is loosely nested on the intermediate shaft 22, and the driving gear 19 of the second power source 42 is engaged with the fourth gear 14.

No matter whether the one stage of deceleration gear train is serving to decelerate, the power of the second power source 42 can be transmitted to the output shaft 23 via the one stage of deceleration gear train, and at this point the second power source 42 can serve to not interrupt the power during the gear shifting of the vehicle, and can also serve to provide an auxiliary power.

The other structures of this embodiment are the same as those of the second embodiment, and are not described repeatedly here.

The Fourth Embodiment

Figure 4:
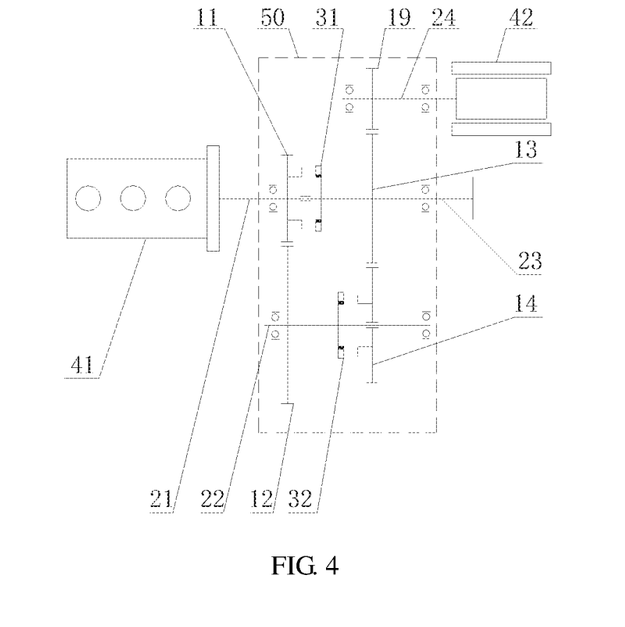
FIG. 4 is a schematic structural diagram of the fourth embodiment of the present disclosure.

FIG. 4 shows the fourth embodiment of the present disclosure. This embodiment is an improvement made on the basis of the third embodiment, and is different from the third embodiment in the mounting position of the second power source 42, wherein the driving gear 19 of the second power source 42 is engaged with the third gear 13.

The other structures of this embodiment are the same as those of the third embodiment, and are not described repeatedly here.

The Fifth Embodiment

Figure 5:
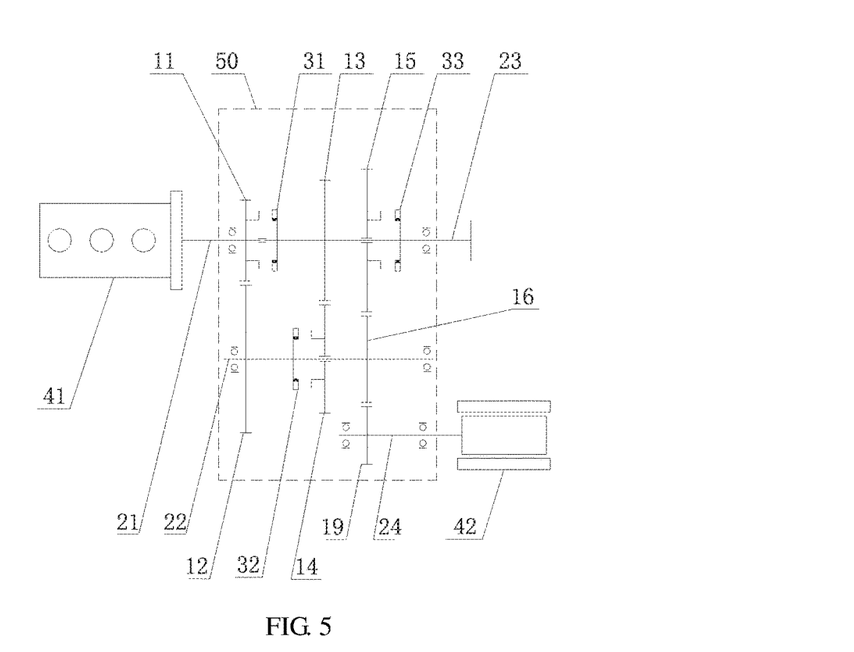
FIG. 5 is a schematic structural diagram of the fifth embodiment of the present disclosure.

FIG. 5 shows the fifth embodiment of the present disclosure. This embodiment is an improvement made on the basis of the third embodiment, and is different from the third embodiment with two stages of deceleration gear train in that, this embodiment provides totally three stages of deceleration gear train, and can realize transmission of three speed ratios.

As shown in FIG. 5, the third stage of deceleration gear train comprises a fifth gear 15 and a sixth gear 16. The fifth gear 15 is loosely nested on the output shaft 23, the sixth gear 16 is fixedly connected to the intermediate shaft 22 by a key, and the driving gear 19 of the second power source 42 is engaged with the sixth gear 16. Only when the one stage of deceleration gear train is serving to decelerate, the power of the second power source 42 is transmitted to the output shaft 23 via the one stage of deceleration gear train, and at this point the second power source 42 serves to provide an auxiliary power.

As shown in FIG. 5, a third shifting clutch 33 is provided cooperating with the fifth gear 15, the third shifting clutch 33 comprises a left-contrate-tooth fluted disc, the left-contrate-tooth fluted disc can slide on the output shaft 23, and can cooperate via a spline, and the fifth gear 15 is provided with a right contrate tooth.

A synchronizer may be employed to replace the shifting clutch, to control the engagement and disengagement of the power. The synchronizer may be of an electromagnetically driven type, or a hydraulically driven type, or a pneumatically driven type, or an electrically driven type.

In the automatic transmission 50 having the three stages of deceleration gear train, the second power source 42 may also be merely engaged with the second stage of deceleration gear train, the particular structure of which may refer to the third embodiment or the fourth embodiment.

The other structures of this embodiment are the same as those of the second embodiment, and are not described repeatedly here.

The Sixth Embodiment

Figure 6:
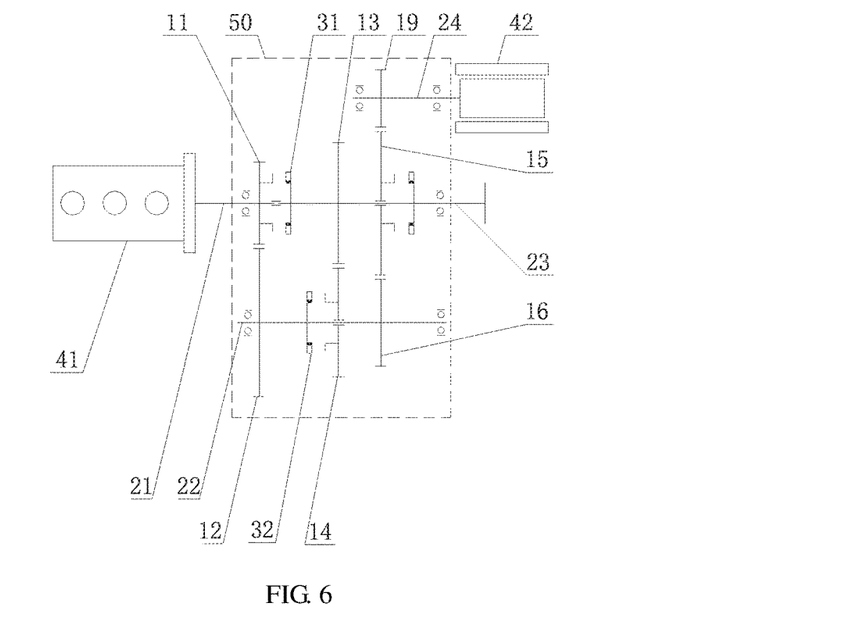
FIG. 6 is a schematic structural diagram of the sixth embodiment of the present disclosure.

FIG. 6 shows the sixth embodiment of the present disclosure. This embodiment is an improvement made on the basis of the fifth embodiment, and is different from the fifth embodiment in the mounting position of the second power source 42, wherein the driving gear 19 of the second power source 42 is engaged with the fifth gear 15.

The other structures of this embodiment are the same as those of the fifth embodiment, and are not described repeatedly here.

The Seventh Embodiment

Figure 7:
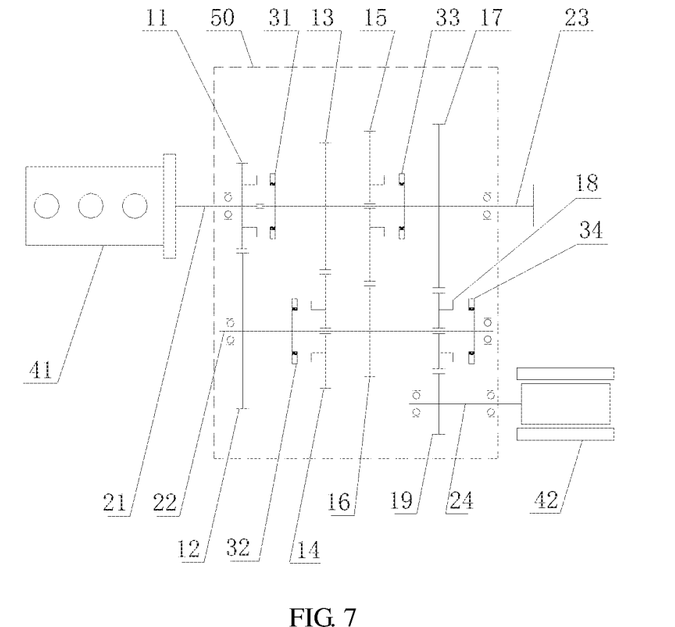
FIG. 7 is a schematic structural diagram of the seventh embodiment of the present disclosure.

FIG. 7 shows the seventh embodiment of the present disclosure. This embodiment is an improvement made on the basis of the fifth embodiment, and is different from the fifth embodiment with three stages of deceleration gear train in that, this embodiment provides totally four stages of deceleration gear train, and can realize transmission of four speed ratios.

As shown in FIG. 7, the fourth stage of deceleration gear train comprises a seventh gear 17 and an eighth gear 18. The seventh gear 17 is fixedly connected to the output shaft 23 by a key, the eighth gear 18 is loosely nested on the intermediate shaft 22, and the driving gear 19 of the second power source 42 is engaged with the eighth gear 18.

No matter whether the one stage of deceleration gear train is serving to decelerate, the power of the second power source 42 can be transmitted to the output shaft 23 via the one stage of deceleration gear train, and at this point the second power source 42 can serve to not interrupt the power in the gear shifting of the vehicle, and can also serve to provide an auxiliary power.

As shown in FIG. 7, a fourth shifting clutch 34 is provided cooperating with the eighth gear 18, the fourth shifting clutch 34 comprises a left-contrate-tooth fluted disc, the left-contrate-tooth fluted disc can slide on the intermediate shaft 22, and can cooperate via a spline, and the eighth gear 18 is provided with a right contrate tooth.

A synchronizer may be employed to replace the shifting clutch, to control the engagement and disengagement of the power. The synchronizer may be of an electromagnetically driven type, or a hydraulically driven type, or a pneumatically driven type, or an electrically driven type.

In the automatic transmission 50 having the four stages of deceleration gear train, the second power source 42 may also be merely engaged with the second stage of deceleration gear train or the third stage of deceleration gear train, the particular structure of which may refer to the third embodiment, the fourth embodiment, the fifth embodiment or the sixth embodiment.

The other structures of this embodiment are the same as those of the fifth embodiment, and are not described repeatedly here.

The Eighth Embodiment

Figure 8:
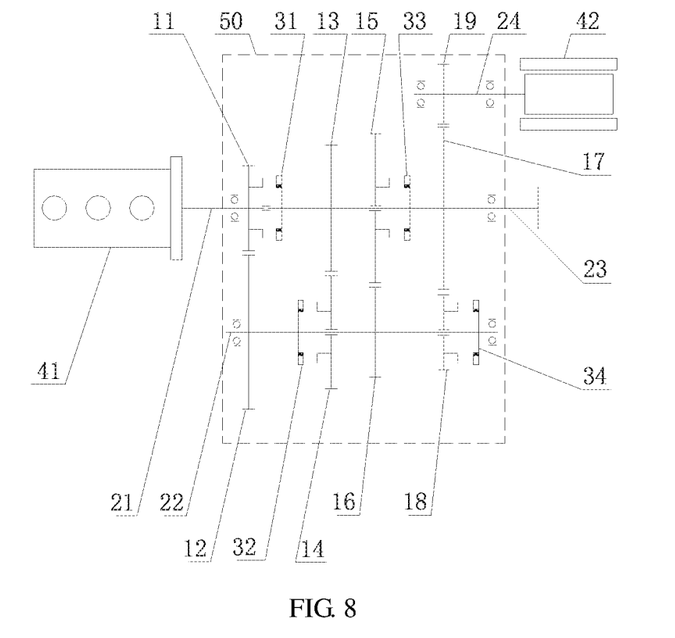
FIG. 8 is a schematic structural diagram of the eighth embodiment of the present disclosure.

FIG. 8 shows the eighth embodiment of the present disclosure. This embodiment is an improvement made on the basis of the seventh embodiment, and is different from the seventh embodiment in the mounting position of the second power source 42, wherein the driving gear 19 of the second power source 42 is engaged with the seventh gear 17.

The other structures of this embodiment are the same as those of the seventh embodiment, and are not described repeatedly here.

The Ninth Embodiment

Figure 9:
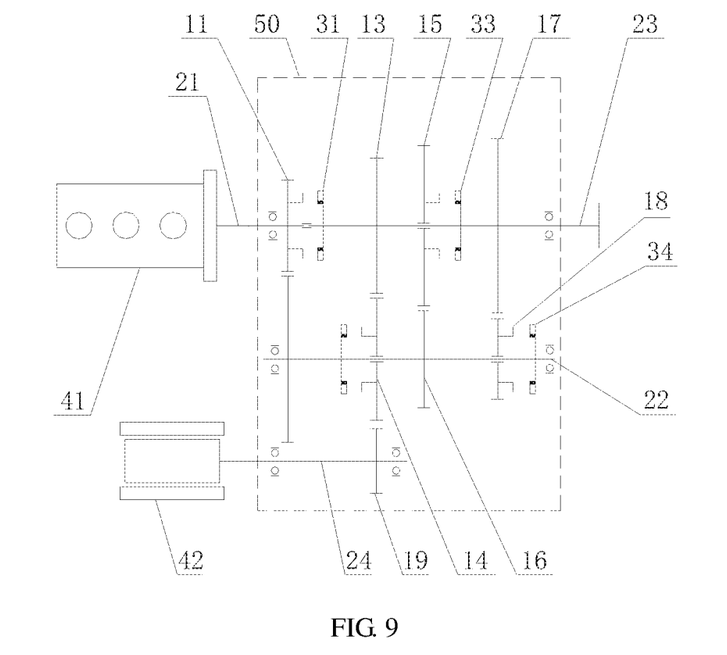
FIG. 9 is a schematic structural diagram of the ninth embodiment of the present disclosure.

FIG. 9 shows the ninth embodiment of the present disclosure. This embodiment is an improvement made on the basis of the seventh embodiment, and is different from the seventh embodiment in the mounting position of the second power source 42, wherein the driving gear 19 of the second power source 42 is engaged with the fourth gear 14.

The other structures of this embodiment are the same as those of the seventh embodiment, and are not described repeatedly here.

The Tenth Embodiment

Figure 10:
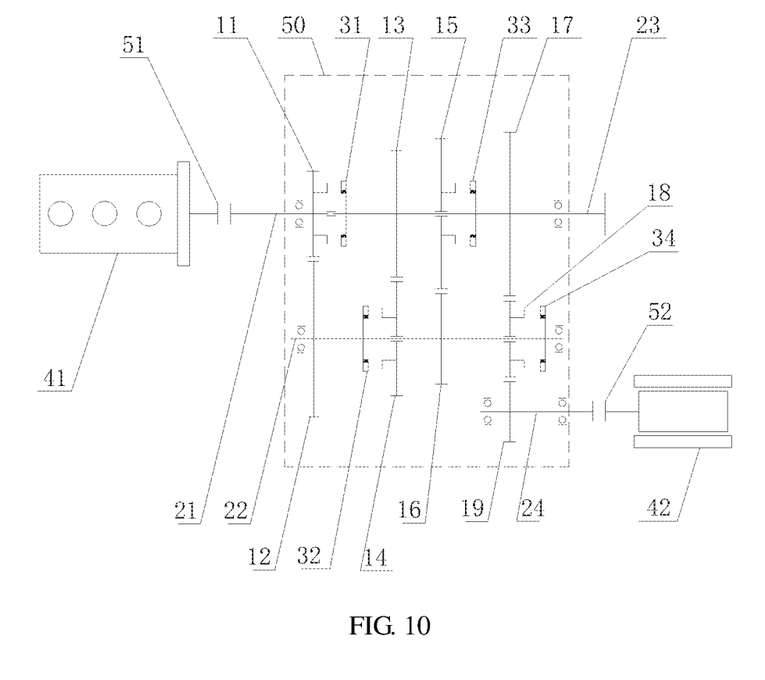
FIG. 10 is a schematic structural diagram of the tenth embodiment of the present disclosure.

FIG. 10 shows the tenth embodiment of the present disclosure. This embodiment is an improvement made on the basis of the seventh embodiment, and is different from the seventh embodiment in that, the first input shaft 21 and/or the second input shaft 24 are provided with cut-off clutches, which are respectively a first cut-off clutch 51 and a second cut-off clutch 52.

Providing the cut-off clutches on the input shafts facilitates controlling the power input state, and the cut-off clutches may be started up in emergency to cut off the power input. That can also avoid the electric motor idling along with the entire vehicle.

A synchronizer may be employed to control the power input state of the input shaft.

The cut-off clutch and the synchronizer may be of an electromagnetically driven type, or a hydraulically driven type, or a pneumatically driven type, or an electrically driven type.

The other structures of this embodiment are the same as those of the seventh embodiment, and are not described repeatedly here.

The Eleventh Embodiment

Figure 11:
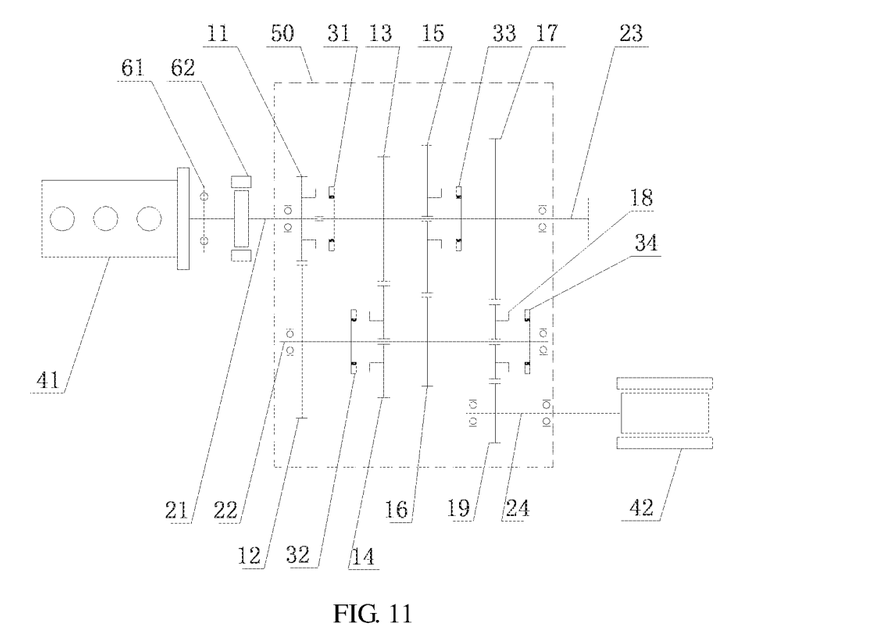
FIG. 11 is a schematic structural diagram of the eleventh embodiment of the present disclosure.

FIG. 11 shows the eleventh embodiment of the present disclosure. This embodiment is an improvement made on the basis of the seventh embodiment, and is different from the seventh embodiment in that, the second power source 42 is an electric motor, and the first power source 41 is the combination of an engine and an ISG motor 62.

When the first power source 41 is the combination of the engine and the ISG motor 62, in an aspect, the engine can be started up and stopped in real time, to reduce the idle oil consumption and pollution of the engine, and in another aspect the ISG motor serves as an electric generator, and can regeneratively generate electricity, and recover energy, to save energy.

When the first power source 41 is the combination of the engine and the ISG motor, if all of the first shifting clutch 31, the second shifting clutch 32, the third shifting clutch 33 and the fourth shifting clutch 34 are disengaged, and at this point the first power source 41 is started up, the power of the first power source 41 cannot be transmitted to the vehicle axle half shaft, and merely the ISG motor 62 serves as an electric generator, and can regeneratively generate electricity, and the electric power is stored to a battery or is used to operate the motor of the second power source 42.

When the first power source 41 has shut down the engine, the ISG motor 62 may also serve as an electric motor.

A torsion damper 61 is provided between the engine and the ISG motor 62.

The design mode of the torsion damper in combination with the contrate tooth clutches can minimize the kinetic energy loss, which overcomes the defect of too short service lives of traditional friction clutches because they cannot withstand the dynamic shock of the electric motor.

The other structures of this embodiment are the same as those of the seventh embodiment, and are not described repeatedly here.

The Twelfth Embodiment

Figure 12:
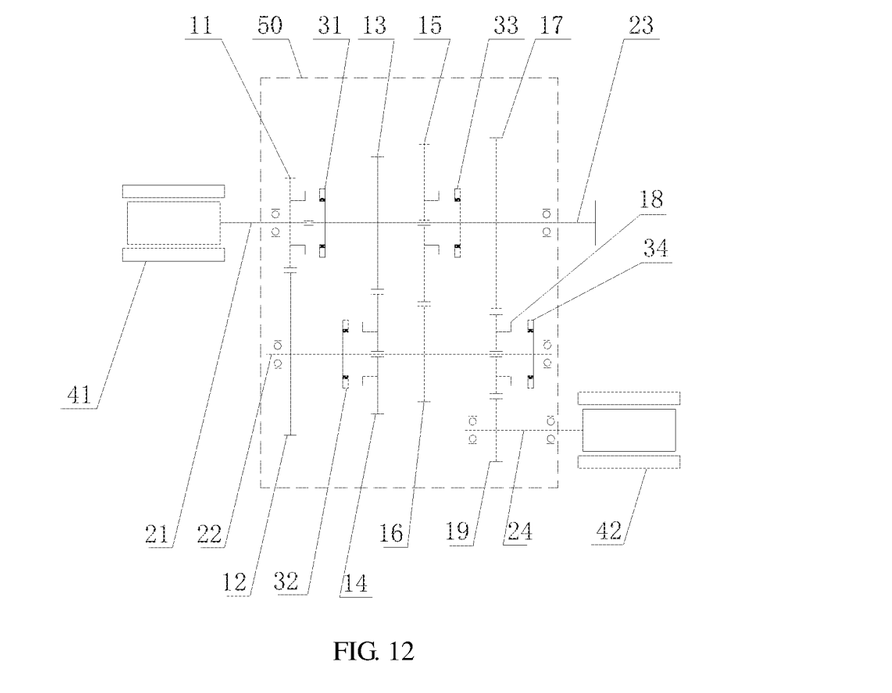
FIG. 12 is a schematic structural diagram of the twelfth embodiment of the present disclosure.

FIG. 12 shows the twelfth embodiment of the present disclosure. This embodiment is an improvement made on the basis of the seventh embodiment, wherein in this embodiment, the second power source 42 is an electric motor, the first power source 41 is also an electric motor.

The other structures of this embodiment are the same as those of the seventh embodiment, and are not described repeatedly here. The above embodiments illustrate the cases wherein the automatic transmission 50 is provided with two stages of deceleration gear train, three stages of deceleration gear train and four stages of deceleration gear train, but the present disclosure may also be expanded to more stages of deceleration gear train, the particular structures of which are configured with respect to the above embodiments, and are not individually listed here.

The description above is merely particular embodiments of the present disclosure. By the foregoing teachings of the present disclosure, a person skilled in the art may make other improvements or modifications based on the foregoing embodiments. A person skilled in the art should understand that, the particular description above is merely for better interpreting the present disclosure, and the protection scope of the present disclosure should be subject to the protection scope of the claims.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A longitudinal dual-power-source vehicle drive assembly, connected to a vehicle axle half shaft, wherein the longitudinal dual-power-source vehicle drive assembly is provided with an automatic transmission, the automatic transmission comprises a first input shaft, a first power source is connected to the first input shaft, an output shaft is provided coaxial with the first input shaft, and an intermediate shaft is provided parallel to the first input shaft; and a first stage of deceleration gear train is mounted through the first input shaft and the intermediate shaft, an Nth stage of deceleration gear train is mounted through the intermediate shaft and the output shaft, N≥2, and each of the stages of deceleration gear train comprises a pair of gears with unequal transmission ratios; wherein
   a second input shaft is provided parallel to the intermediate shaft or the output shaft, a second power source is connected to the second input shaft, the second input shaft is provided with a driving gear, the driving gear is engaged with an upper gear or a lower gear of any one of stages from a second stage to the Nth stage of deceleration gear train, and power of the second power source is transmitted to the output shaft via the one stage of deceleration gear train,
   wherein the second power source is an electric motor, and the first power source is an engine, the first input shaft and a driving shaft of the first power source are integrally manufactured, and the second input shaft and a driving shaft of the second power source are integrally manufactured.

2. The longitudinal dual-power-source vehicle drive assembly according to claim 1, wherein in the Nth stage of deceleration gear train, one upper gear is fixedly connected to the output shaft by a key, one lower gear is loosely nested on the intermediate shaft, the driving gear of the second power source is engaged with the upper gear or the lower gear, and power of the second power source is able to be uninterruptedly transmitted to the output shaft via the one stage of deceleration gear train.

3. The longitudinal dual-power-source vehicle drive assembly according to claim 1, wherein in the Nth stage of deceleration gear train, one upper gear is loosely nested on the output shaft, one lower gear is fixedly connected to the intermediate shaft by a key, and only when the one stage of deceleration gear train is in use, power of the second power source is transmitted to the output shaft via the one stage of deceleration gear train.

4. The longitudinal dual-power-source vehicle drive assembly according to claim 3, wherein a torsion damper is provided between the engine and the ISG motor.

5. The longitudinal dual-power-source vehicle drive assembly according to claim 1, wherein a cut-off clutch or synchronizer is provided at the first input shaft and/or the second input shaft.

6. The longitudinal dual-power-source vehicle drive assembly according to claim 1, wherein in the first stage to Nth stage of deceleration gear train, each of the stages of deceleration gear train is provided with a shifting clutch or synchronizer cooperating therewith.

7. The longitudinal dual-power-source vehicle drive assembly according to claim 5 wherein the shifting clutch or the synchronizer is electromagnetically driven, or hydraulically driven, or pneumatically driven, or electrically driven.

8. The longitudinal dual-power-source vehicle drive assembly according to claim 1, wherein the vehicle axle half shaft is a front axle half shaft or a rear axle half shaft.

9. The longitudinal dual-power-source vehicle drive assembly according to claim 6, wherein the shifting clutch or the synchronizer is electromagnetically driven, or hydraulically driven, or pneumatically driven, or electrically driven.

\* \* \* \* \*